March 10, 1936.  C. C. RHOADES  2,033,739
BRAKE LINING STRETCHER
Original Filed Dec. 20, 1933
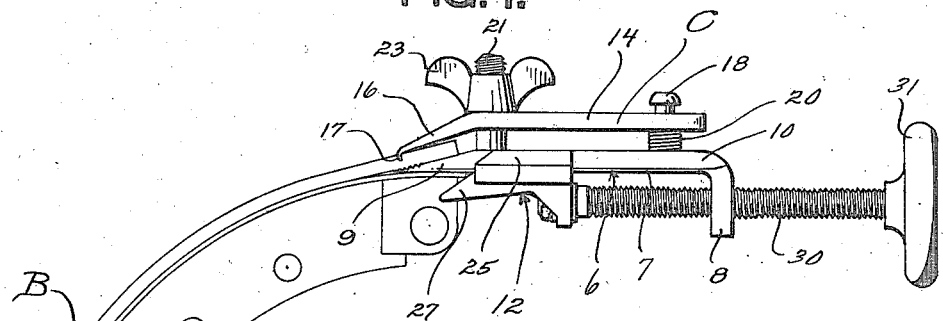
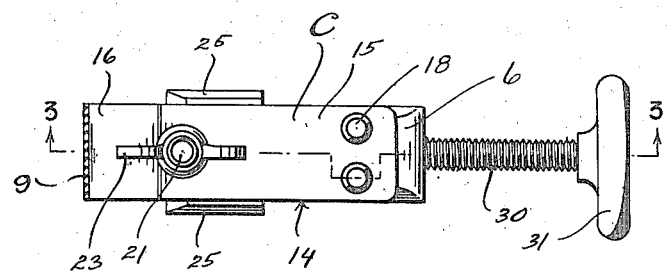
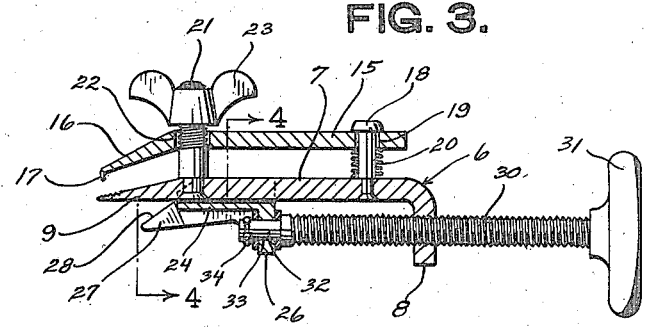
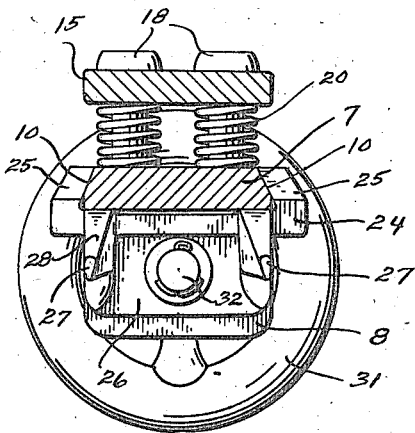
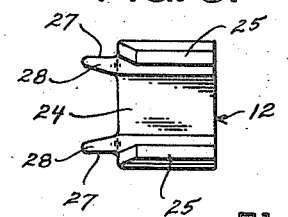
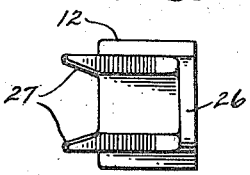
INVENTOR.
Charles C. Rhoades
BY
Lancaster, Allwine and Rommel
ATTORNEYS.

Patented Mar. 10, 1936

2,033,739

UNITED STATES PATENT OFFICE 2,033,739

BRAKE LINING STRETCHER

Charles C. Rhoades, Beverly Hills, Calif.

Refiled for abandoned application Serial No. 703,280, December 20, 1933. This application September 25, 1935, Serial No. 42,152

3 Claims. (Cl. 29—84)

The present invention relates to a tool or device for use in the relining of brakes and the primary object of the invention is to provide a brake lining stretcher for stretching brake lining on brake shoes to permit proper securing of the lining to the shoe.

A further object of the invention is to provide a brake lining stretcher which is adapted for use upon all types of internal brake shoes for stretching the lining evenly thruout the length of the shoe.

A further and important object of the invention is to provide a brake lining stretcher which will not interfere with the counter-sinking operation being properly performed by the countersinking attachment on present forms of brake relining machines.

A further and important object of the invention is to provide a tool of this character which will permit riveting of the lining at the extreme end of the shoe without liability of breaking or otherwise injuring the lining.

A further object resides in the arrangement whereby the tool is held against tipping up when applied to the brake shoe and tightened, and a tool of this character wherein the force applied for stretching the lining acts in a direction tangentially of the arc of the brake shoe so as to eliminate binding.

Other objects and advantages of the invention will be apparent from the following detailed description, taken in connection with the accompanying drawing forming a part of this specification and in which drawing:—

Figure 1 is a view in side elevation of the improved brake lining stretcher shown in position for use upon a conventional type of brake shoe.

Figure 2 is a top plan view of the lining stretcher or tool.

Figure 3 is a longitudinal section on the line 3—3 of Figure 2.

Figure 4 is an enlarged transverse section on the line 4—4 of Figure 3.

Figures 5 and 6 are top and bottom plan views respectively of the tensioning member or block.

Referring to the drawing in detail and wherein like reference characters designate corresponding parts thruout the several views, the letter A may designate a conventional type of internal brake shoe, B the brake lining and C the improved tool for stretching the lining on the shoe.

As is usual practice, the metal shoe A is provided with suitable openings or holes thruout its length for receiving rivets which extend thru the lining B for securing the lining to the shoe. Two of these openings are provided closely adjacent each end of the shoe for securely fastening the ends of the lining and it is extremely desirable that the lining be securely fastened at each end to prevent possible buckling or crowding during use. In applying the lining to the brake shoe, a countersink is provided in the lining at each opening in the shoe for setting the rivets below the working face of the lining and this is usually accomplished by means of a countersinking unit embodied in a brake relining machine. In Figure 1, showing the tool in position at one end of the brake shoe for stretching the lining on the shoe, the lining has been secured at one end to the shoe as by the rivets 5.

Referring now to the specific construction and operation of the improved lining stretcher C, the same comprises a main clamping member 6 providing an elongated flat slide portion 7 having at its outer or rear end a downturned bearing portion 8. The forward end of the slide portion 7 is beveled or tapered off at its upper side into a relatively thin edge at the forward tip of the slide portion to form a thin tapering or wedge shaped jaw 9. The gripping face of the jaw 9 may be roughened or knurled in any suitable manner along its forward portion to form a gripping surface for the lining B. The side edges of the slide portion 7 are upwardly beveled as at 10 to receive with a sliding dovetail fit, a tensioning member or block 12 adapted for sliding movement along the under side of the slide portion 7.

Adjustably mounted upon the upper side of the slide portion 7 to extend longitudinally thereof, is a clamping plate 14 embodying a flat body portion 15 having an angularly offset tapering jaw 16 at its forward end adapted to overlie and coact with the jaw 9. The thin forward edge of this jaw 16 is formed with a downturned lip or flange 17 which is intended to bite into the lining when the lining is clamped between the jaws 9 and 16.

Secured at their lower ends in the rear portion of the slide portion 7 and aligning transversely of the portion 7, is a pair of guide posts 18 which extend upwardly thru openings 19 in the rear end portion of the clamping plate 14 and are headed at their upper ends to limit separation of the clamping plate from the slide portion 7. The openings 19 are slightly larger than the posts 18 to permit limited rocking movement of the clamping plate 14. Encircling each guide post 18 is an expansion coil spring 20 and these coil springs serve to normally urge the portions 7 and 14 apart and spread the jaws 9 and 16 as shown in Figure 3. Secured at its lower end to the slide portion 7 at the rear end of the jaw 9 is a clamping stud 21 having a threaded upper end adapted to project thru an opening 22 formed thru the plate 14 at the forward end of the flat body portion 15. This stud 21 is disposed midway between the side edges of the slide portion 7, and the opening 22 is enlarged and slightly elongated longitudinally of the clamping plate. Threaded upon the upper end of the stud 21 is a wing nut 23 which serves to close the jaws 9 and 16 upon the brake lining.

The tensioning member or block 12 is formed with a plate portion 24 provided along each side edge with upwardly projecting guide flanges 25 which are undercut at their inner faces to have an interlocking sliding dovetail fit with the beveled side edges 10 of the slide portion 7. Projecting downwardly from the rear edge of the plate 24 is a coupling flange 26 extending parallel to the downturned portion 8 of the clamping member 6. Projecting forwardly from the plate 24 is a pair of spaced apart tapered fingers 27 having beveled edges 28 which coact with the under flat face of the slide portion 7 to provide a V-shaped pocket for receiving an end of the brake shoe as shown in Figure 1.

Threaded thru the downturned bearing portion 8 to extend parallel below the slide portion 7 is a pressure screw 30 provided at its outer end with a suitable hand wheel 31 for imparting rotation to the screw. The inner end of this screw 30 is reduced as at 32 and rotatably extended thru an opening 33 provided in the coupling flange 26. The reduced spindle portion 32 forms a shoulder which acts to force the tensioning member 12 towards the forward end of the clamping member 6 upon rotation of the screw 30 in one direction. A cotter pin or the like 34 is provided at the free end of the spindle portion 32 for detachably coupling the member 12 to the screw 30 and causing rearward movement of the member 12 upon rotation of the pressure screw.

In use of the improved tool for properly stretching a lining upon a brake shoe, the lining is first riveted to one end of the brake shoe as shown at 5 in Figure 1. With the tool in an open positon as shown in Figure 3, the clamping plate 14 will be urged away from the clamping member 6 by the coil springs 20 and thus spread the jaws 9 and 16. The opposite or free end of the lining is then placed between the jaws 9 and 16 and the wing nut 23 tightened for clamping the lining between the jaws. As the nut 23 is tightened, the springs 20 are compressed allowing the body portion 15 to move bodily toward the slide portion 7. The lower flat side of the jaw 9 is then placed upon the face of the flange of the brake shoe at the opposite end from which the lining has been secured so as to extend tangentially of the shoe. The screw 30 is then rotated by the hand wheel 31 forcing the tensioning block 12 against the end of the brake shoe with the beveled fingers 27 engaging beneath the flange of the shoe as shown in Figure 1. The screw 30 is then tightened until the lining is stretched to the desired tautness and at which time the tips of the thin tapering jaws 9 and 16 will be closely adjacent the extreme end of the shoe and beyond the two riveting holes in the end of the shoe. With the desired tension on the lining, countersink and rivet the lining in the two holes at the end of the shoe to which the lining stretcher is applied. With the lining stretched and riveted at both ends, the lining stretcher may now be removed and the lining riveted along its intermediate portion.

Owing to the specific shape of the jaw 9, wherein it will be noted that the jaw 9 is brought to a sharp taper at the tip so as to slip between the lining and the face of the brake shoe, the lining will be in contact with the shoe so as to prevent breaking the lining when riveting at the extreme end of the shoe. The shape of the jaws 9 and 16 is also such as to permit of this end securing of the lining being accomplished upon present types of countersinking and riveting machines.

The tool is capable of use upon practically all types of internal brake shoes as now in use, and by having the tensioning block 12 removable to permit use of various forms of tensioning blocks, the tool may be made universal in its use.

Changes in details may be made to the form of invention herein shown and described, without departing from the spirit of the invention or the scope of the following claims.

I claim:

1. In a brake lining stretcher, a clamping member having an elongated flat slide portion provided at its forward end with a thin tapering jaw, a clamping plate laterally movable toward and from the slide portion and provided at its forward end with a thin tapering jaw overlying said first mentioned jaw, means for moving the clamping plate toward the slide portion for clamping the lining between the jaws, a tensioning block slidable along the under side of the slide portion and having forwardly projecting fingers at its forward end providing a brake shoe receiving pocket, and a screw threaded thru the rear portion of the clamping member and connected to said block for imparting movement thereto toward and from said jaws.

2. In a brake lining stretcher, a clamping member including an elongated flat slide portion having its forward end beveled off at its upper side into a thin wedge-shaped jaw, an elongated flat clamping plate overlying the slide portion and retained for movement laterally toward and from the slide portion, said clamping plate having a thin tapering jaw at its forward end angularly offset toward said first mentioned jaw, means for moving the clamping plate toward the slide portion for clamping the lining between the jaws, a tensioning block slidable along and at the under side of the slide portion toward and from the jaw thereof, and means for imparting movement to the block.

3. In a brake lining stretcher, a clamping member including an elongated flat slide portion formed with a tapering jaw at its forward end and having a down-turned bearing portion at its rear end, guide posts projecting upwardly from the rear portion of the slide portion, a stud bolt projecting upwardly from the forward portion of the slide portion, a clamping plate guided on the posts and stud bolt toward and from the slide portion and having a tapering jaw at its forward end, springs encircling the guide posts and normally urging the clamping plate from the slide portion, a wing nut threaded on the stud bolt for moving the clamping plate toward the slide portion to close said jaws, a tensioning block slidably guided on the slide portion, and an operating screw for the block and threaded thru said bearing portion.

CHARLES C. RHOADES.